INVENTORS
FLORIAN J. SHOOK,
JOHN W. WHITE AND
BY EDWIN E. MALLORY

Oberlin & Limbach
ATTORNEYS.

Nov. 15, 1949    F. J. SHOOK ET AL    2,488,340
UNDERPLY TURN-UP AND OVERPLY TURN-DOWN DEVICE
Filed May 20, 1947    4 Sheets-Sheet 4

INVENTORS
FLORIAN J. SHOOK,
JOHN W. WHITE AND
BY EDWIN E. MALLORY

Oberlin & Limbach
ATTORNEYS.

Patented Nov. 15, 1949

2,488,340

UNITED STATES PATENT OFFICE 2,488,340

UNDERPLY TURNUP AND OVERPLY TURNDOWN DEVICE

Florian J. Shook, Akron, John W. White, Wadsworth, and Edwin E. Mallory, Cuyahoga Falls, Ohio, assignors to National Rubber Machinery Company, Akron, Ohio, a corporation of Ohio Application May 20, 1947, Serial No. 749,276

11 Claims. (Cl. 154—10)

1

This invention relates to tire building machines and particularly to an underply turn up and overply turn down device for use in connection therewith.

In the building of pneumatic tire carcasses, the general practice is to apply one or more layers or strips of uncured underply material with the margins overhanging the drum ends, on a rotatable drum, and, while rotating the drum, to roll or "stitch" the material down smoothly into contact with the periphery of the drum, apply bead cores at the ends of the drum, in overlying relation to the underply, turn up the underply about the bead cores, apply strips of overply material over the underply on the outer periphery of the drum, stitch them in place and then turn them down around the underply material already installed on bead cores so as to incorporate the bead cores in the carcass. Subsequently, additional strips of uncured material including tread stock are added and stitched in place and the carcass is removed from the drum for subsequent operations.

One of the principal objects of the present invention is to provide a device which is operative to fold and press layers of ply material which overhang the ends of a rotating forming drum around the annular bead cores on the drum ends progressively from the inner to the outer peripheral surface of the drum and progressively from the outer to the inner peripheral surface of the drum, selectively, while the drum is rotating.

A more specific object is to provide a ply turning device which is operative to apply a ply folding and stitching tool, under yielding uniform pressure, to ply material overhanging the end of a rotating forming drum at one peripheral surface of the drum and to move the tool through an orbit of about 180° about the annular axis of the annular bead core to the other peripheral surface of the rotating drum while maintaining the pressure in a direction generally toward the annular axis of the core, thereby turning the ply and stitching it in place.

Another specific object is to control the device so as to perform the ply turn up and the ply turn down cycles automatically, selectively.

Another object is to provide a device of the general character described which is self-adjusting for variations in thickness of ply, out-of-roundness of the drum, and the like.

Another object is to provide a pair of ply folding and stitching devices which are arranged at opposite ends of the drum and operate in unison so as to turn up and turn down the ply material

2 in the manner described concurrently at both ends of the drum.

A more specific object is to provide a pair of such devices which can be adjusted readily lengthwise of the drum for accommodating them for use with drums of different length.

Other objects and advantages will become apparent from the following description wherein reference is made to the drawings in which:

Fig. 6 is an enlarged fragmentary diagrammatic view illustrating the relation of the underply and bead core preparatory to the turn up operation;

Fig. 7 is a diagrammatic illustration showing the movement of the roller for effecting the underply turn up operation;

Fig. 8 is a diagrammatic view illustrating the relation of the overply to the bead core and underply preparatory to the turn down operation;

Fig. 9 is a diagrammatic view illustrating the movement of the roller for effecting the ply turn down operation;

Figure 1:
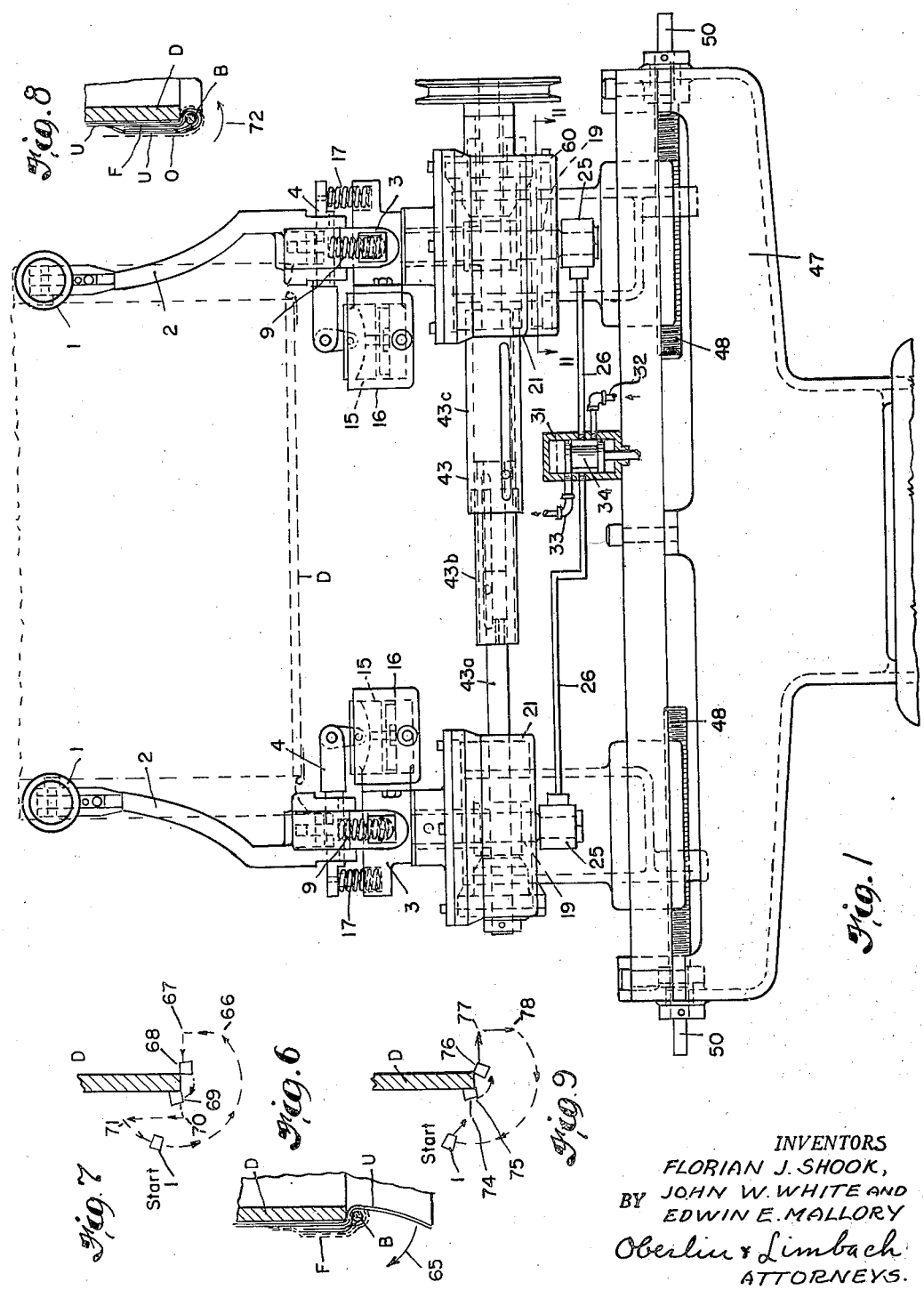
Fig. 1 is a front elevation of a ply turning device embodying the principles of the present invention.

Referring to Fig. 1, two substantially identical ply turning devices are shown in cooperation with a single drum so that the ply may be manipulated concurrently on both ends of the drum. Since the devices are essentially the same, one only will be described in detail. As illustrated, the two devices are arranged to operate at opposite ends of the drum D which is of the usual type and open at both ends.

Referring to the left-hand one of the devices in Fig. 1, the device comprises generally a ply turning roller 1 which is adapted to be moved first to a position wherein its axis is substantially parallel to the axis of the drum D, and then to be moved from its initial position in a direction transversely of its axis so as to be pressed against the ply material on the drum adjacent the drum end and, while so pressed and yieldably held in contact therewith, to be rotated through 180° about an axis angularly disposed to the axis of the drum and its own axis.

For convenience in illustration and description of the relative position of the parts, the drum D is shown as rotatable about a horizontal axis with the roller 1 engaging the drum substantially at a horizontal plane through the drum axis and the positions of the parts and their movements are described relative to this horizontal position of the drum. The roller 1 is terminally mounted at the upper end of a rigid generally upright arm 2 which, in turn, is supported at its lower end on a head portion 3a of a rotatable support 3. The support 3 is rotatable about an upright axis. The arm 2 is secured to the support 3 for rotation therewith and for universal tilting movement relative thereto toward and away from the upright rotational axis of the support 3.

This universal tilting movement is provided by mounting the arm for rocking movement on a pivot 4 which normally is horizontal, and is carried by the head portion 3a. The pivot 4, in turn, is adapted to be tilted about a horizontal axis offset vertically below, and spaced angularly about the upright axis of the support 3 from the axis of the pivot 4, as will hereinafter be described more fully.

In order to rock the arm 2 about the pivot 4, the arm 2 s provided with an integral lever 5 which is connected by a suitable link 6 to a piston 7 of a fluid pressure cylinder 8. The cylinder 8 is fixed in position on the head portion 3a. A suitable restoring spring 9 is operatively interposed between an extension 10 of the arm 2 and a stationary abutment 11 which, in the form illustrated, is formed on a fixed pivot 12. The pivot 12 is fixed in position on the support 3 and extends generally horizontally and at right angles to the pivot 4 and is spaced therebeneath. The head portion 3a of the support 3 is connected to the support 3 by the pivot 12 so that the head portion 3a, and therewith the pivot 4 and arm 2, can rock about the pivot 12. The rock or tilt the pivot 4 and head portion 3a about the pivot 12, the pivot 4 is connected at one end by a link 14 to a piston 15 of a fluid pressure cylinder 16. The cylinder 16 is fixedly secured to the support 3 for rotation therewith. A restoring spring 17 is operatively interposed between the end of the pivot 4 which is opposite from the link 14 and a suitable socket 18 in the rotatable support 3. Thus, by operation of the pistons 7 and 15 in pre-determined relations to each other, or concurrently, the arm 2 can be tilted about both the pivot 4 and the pivot 12, sequentially or concurrently.

Since these pivots are arranged at substantially 90° to each other, the arm is capable of universal tilting movement about the upright rotational axis of the support 3.

In order to rotate the support 3 about an upright axis it is provided with a suitable depending shaft 19 which may be integral with the support 3. The shaft in turn is rotatably mounted in a suitable bearing portion 20 of a housing 21. At its lower end the shaft is provided with a driven gear 22 which is engaged by a suitable driving worm gear 23, both the gears 22 and 23 being located within the housing 21.

In order to supply pressure fluid to the cylinders 8 and 16 conveniently in all rotated positions of the support 3, the shaft 19 is provided with a longitudinal duct 24 which extends from its lower end upwardly into the support 3. A suitable slip fitting 25 is mounted on the lower end of the shaft and is connected by a suitable pipe to a pressure fluid supply hose or line 26. The support 3 in turn is provided with a lateral duct 27a which is connected at one end to the duct 24, extends through the outer peripheral wall of the support 3, and is connected by a pipe 27 and suitable flexible hose 28 to the cylinder 8.

The cylinder 8 in turn is provided with a discharge orifice 29 which is connected by a suitable hose 30 to the cylinder 16. Flow restricting means are operatively interposed between cylinders 8 and 16 so that upon admission of pressure fluid to the cylinder 8 the piston 7 is first raised rapidly to position the roller 1 initially and fluid is more gradually admitted from the positioning cylinder 8 to the cylinder 16 which applies the roller 1 under yielding pressure in operating position. In the form illustrated the orifice 29 is restricted relative to the inlet orifice into the cylinder 8 to provide the flow restricting means to the inlet orifice into the cylinder 16.

Referring again to Fig. 1, a suitable electromagnetic control valve 31 is connected in the line 26 between the two devices for controlling the admission of pressure fluid thereto and to exhaust pressure fluid therefrom. For purposes of illustration the valve 31 is shown as a piston type having an inlet or a main supply line 32 and an exhaust or return line 33. The ports of the lines 26, 32 and 33 are positioned relative to the piston 34 of the valve so that upon lowering the piston from its upper or "off" position, fluid pressure is first admitted to the line 26 and flows therethrough to both devices and upon raising of the piston the admission of fluid from the line 32 is prevented and the line 26 is connected to the return line or exhaust line 33.

In order to rotate the supports 3 of the devices, a suitable reversible electric motor 40 is provided and is connected by means of a belt 41 to a suitable pulley 42. The pulley 42 is mounted on a shaft, indicated generally at 43, the shaft extending through the housings 21 of the devices and carrying the worm gears 23 respective to the gears 22. Since it is desirable to adjust the devices endwise of the drum, as will later be described, the shaft 43 is made in three spline sections indicated generally at 43a, 43b and 43c.

Figure 2:
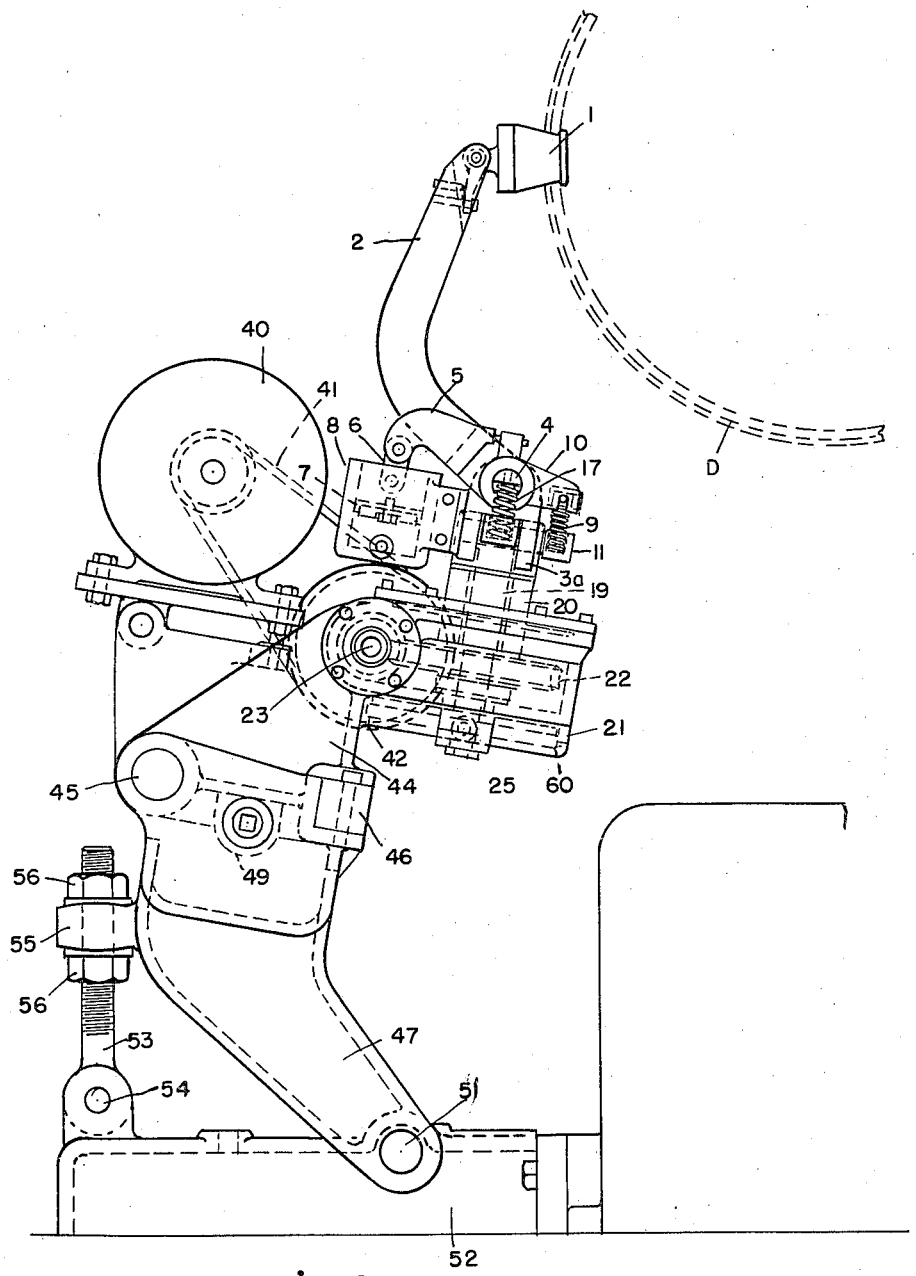
Fig. 2 is a side elevation of the structure illustrated in Fig. 1.
Figure 3:
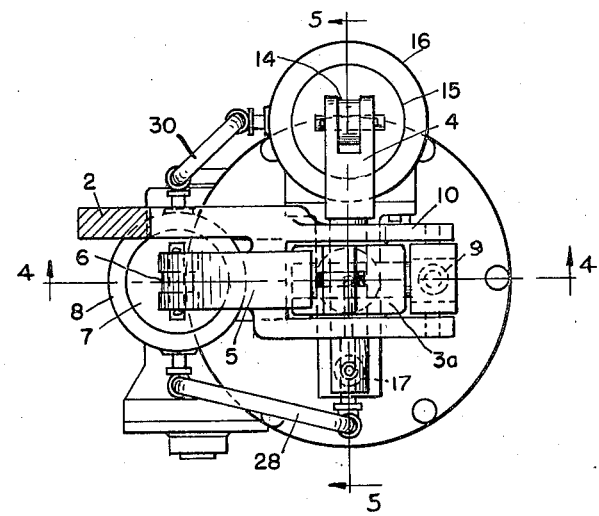
Fig. 3 is a fragmentary top plan view of the device illustrated in Fig. 2.
Figure 4:
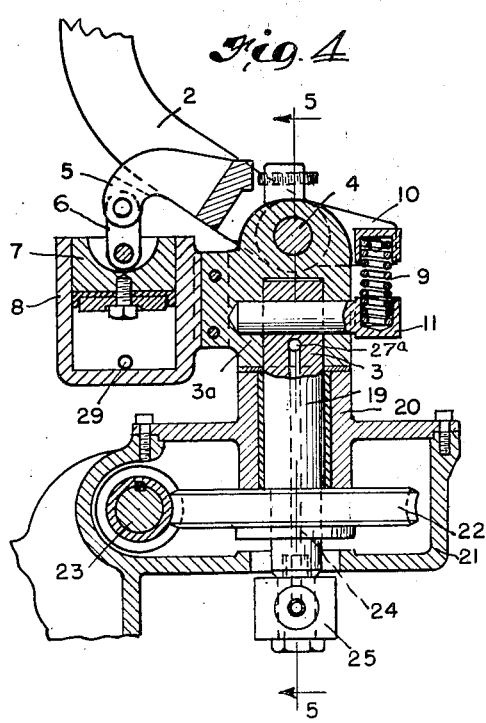
Fig. 4 is a fragmentary sectional view taken on the line 4—4 of Figs. 3 and 5.
Figure 5:
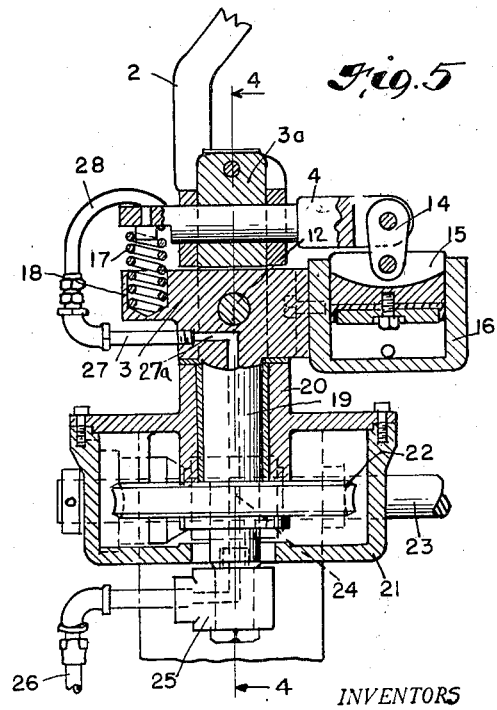
Fig. 5 is a fragmentary sectional view taken on the line 5—5 of Figs. 3 and 4.

As best illustrated in Fig. 2 each of the housings 21 is fixedly mounted on a bracket 44. The brackets 44, in turn, are mounted upon a slide rod 45 and slide bar 46. The rod 45 and bar 46 extend parallel to the drum axis and are fixedly mounted in a base 47. Carried by the base 47 are rotatable screws 48, which extend parallel to the rod 45 and are in threaded engagement with depending bosses 49 which are rigid with the brackets 44, respectively. Each of the screws 48 is provided with a square end 50 adapted to receive a suitable wrench for turning the screws to move the brackets 44, and consequently the devices, to the desired positions axially of the drum. In order to swing the devices to adjusted positions generally radially of the drum for meeting various conditions of drum size, ply thickness and the like, the base 47 is mounted for rocking movement on a horizontal shaft 51 which is secured in the frame 52 of the tire building machine. A suitable eye bolt 53 is pivotally secured by a pivot 54 to the frame 52 and is received through a suitable eye 55 on the base 47. Lock nuts 56 are provided for adjusting the positions of the eye 55 along the bolt 53 and thus anchoring the base 47 in different adjusted positions about the axis of the shaft 51.

As illustrated in Fig. 2 the housing 21 of one of the devices, for example the right-hand device in Fig. 1, is provided at the bottom with a supplemental housing 60 through which its upright shaft 19 extends. Carried on the shaft 19 within the supplemental housing 60 is a cam which rotates with the shaft and successively engages cooperating switches arranged about the interior of the housing 60 for controlling automatically the operation of the devices throughout preselected cycles, as is described more fully hereinafter.

The cycles of operation desired are best described by reference to Figs. 6 thru 9.

Referring to Figs. 6 and 7 there is illustrated a portion of one end of the drum D on which the underply U has been applied and over which a bead core B and flipper strip F have been installed preparatory to turning up about the bead core the underply margin which overhangs the end of the drum D. This overhanging end of the underply is to be turned about the bead core in the direction indicated by the arrow 65. Assuming the roller 1 is in the starting position illustrated in Fig. 7, the support 3 is rotated to effect orbital movement of the roller 1 about the upright axis of the support 3 until it reaches a position inwardly from the periphery of the drum, as indicated at 66. Operation of the positioning cylinder 8 causes the arm to tilt about the pivot 4 and thus carry the roller generally lengthwise of the drum into position indicated approximately at 67 in which position the roller is radially inwardly from the bead core B with its axis generally parallel to the drum axis. The pressure cylinder 16 operates to rock the arm about the pivot 12 and thus carry the roller 1 radially outwardly of the drum into contact with the underply at the inner surface of the core B, this position being indicated at 68. While both cylinders 8 and 16 remain under pressure, the rotation of the support 3 is reversed, causing the roller to move in an orbit about the annular axis of the core B while being pressed against the underply by the cylinder 16, and thus to roll the underply around the bead outwardly of the drum and against the flipper strip F on the outer periphery of the drum. The final position of the roller 1 while in contact with the underply is indicated at 69. During the movement from position 68 to 69 the pressure cylinder 16 yieldably presses the roller 1 against the ply so that it is both rolled smoothly and stitched firmly thereto and to the flipper strip on the outer periphery of the drum. Release of the pressure in the pressure cylinder 16 causes the roller 1 to move to the position 70 out of contact with the drum and release of the pressure in the positioning cylinder 8 permits the arm to rock and carry the roller to the position 71. The rotation of the support 3 is reversed to return the roller from the position 71 to the starting position indicated. Obviously by adjusting the size of the restriction for the passage of fluid from the cylinder 8 to the cylinder 16, adjustment in the time relation between positioning of the roller 1 and the application of pressure thereto can be obtained and these may occur concurrently or sequentially.

Referring next to Fig. 8 the drum D is shown with the underply U, bead core B, and flipper strip F in the position which they are installed following the operation illustrated in Fig. 7. Overply O next is placed over the upturned underply and extends beyond the end of the drum and is to be turned down or inwardly, as indicated by the arrow 72, around the underply which surrounds the bead core B. This operation is effected as illustrated in Fig. 9, the roller 1 being at rest in the starting position S. The positioning cylinder 8 operates to move the roller 1 to the position 74 in which it is adjacent the end of the drum. The cylinder 16 operates to move the roller to the position indicated at 75 in which position it is pressed firmly against the overply on the outer periphery of the drum adjacent the end of the drum. Thereupon the support 3 is rotated to cause the roller 1 to pass around the overply on the bead core, the fluid pressure being maintained in both cylinders 8 and 16 during this operation. When the roller has travelled around the surface of the overply overlying the bead core to the position indicated at 76, the pressure in the cylinders is released. Thereupon, the roller moves out of contact in a direction generally radially inwardly of the drum to the position indicated at 77 due to the release of the pressure in the pressure cylinder, and outwardly endwise of the drum to the position indicated at 78, due to the release of the pressure in the positioning cylinder 8. Thereupon, the support 3 is driven in the reverse direction to return the roller to the starting position S. It is apparent that with the device described, the roller may be moved through an orbit of approximately 180° about the annular axis of the bead core while being held in yielding or resilient pressure contact with the ply to be turned, regardless of the direction of turning, and then removed to an inoperative position affording ample clearance for effecting other operations on the tire carcass.

Figure 10:
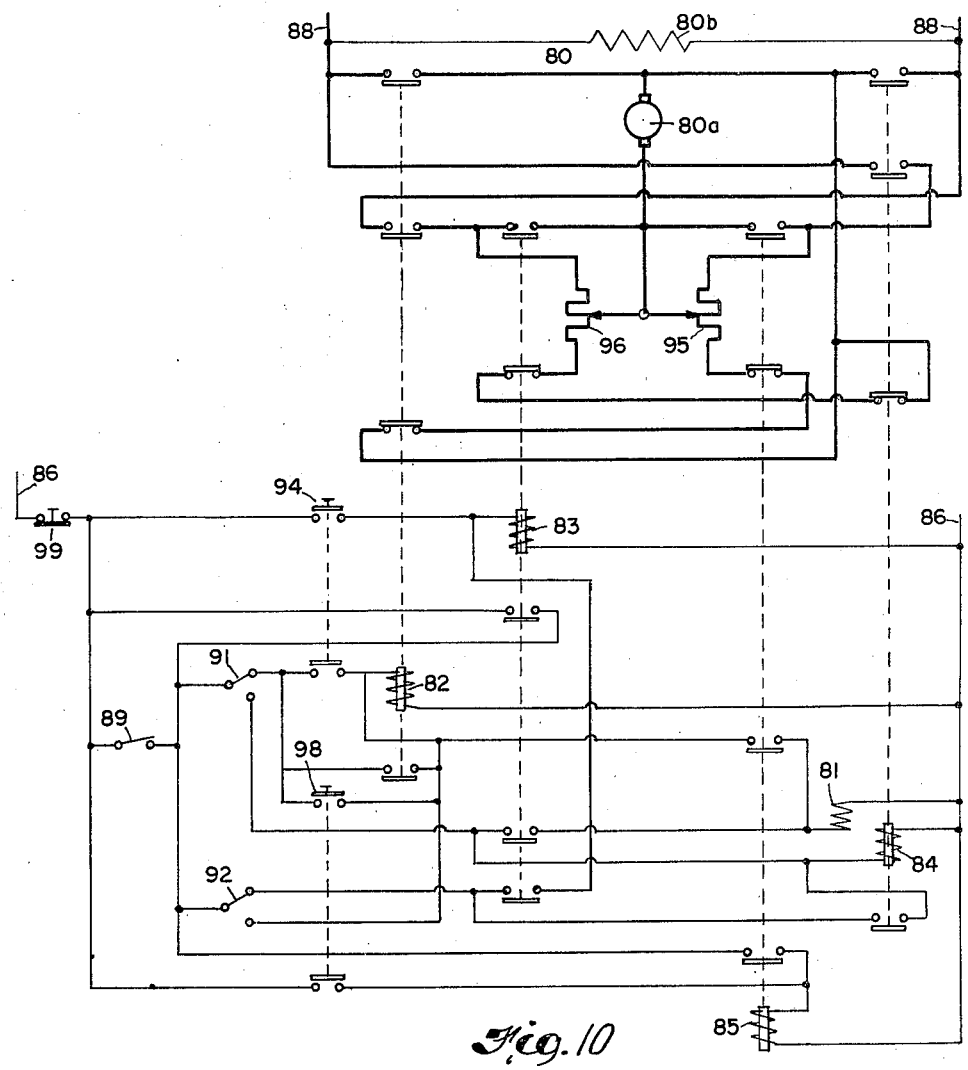
Fig. 10 is a wiring diagram of the control means of the device.

For automatically governing the cyclic movements of the roller 1 as hereinbefore described a suitable controller such as shown in Fig. 10 is provided for a roller driving motor 80 and an operating winding 81 for the valve 31. The controller comprises electromagnetic contactors 82, 83, 84, and 85 which together with the valve winding 81 are preferably supplied from a suitable source of alternating current 86. The motor 80 is supplied from a direct current source 88 and has an armature winding 80a and a shunt field winding 80b.

Figure 11:
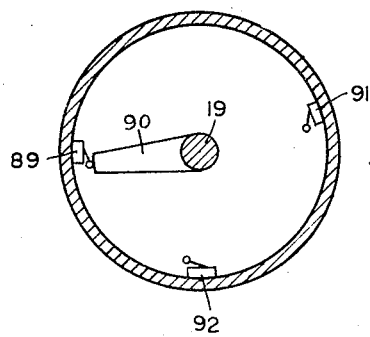
Fig. 11 is a sectional view taken on line 11—11 of Fig. 1, showing the positions of the cam and limit switches forming part of the control means of Fig. 10.

When the tools are in rest position, a single-throw limit switch 89 is held open by a cam 90 (Fig. 11) on the shaft 19 and double-throw limit switches 91 and 92 are in their upper positions as shown in Fig. 10. The limit switches 89, 91, and 92 are preferably of the micro-switch type and are mounted on the housing 60 in circumferential spaced relation so as to be operated by the cam 90 when the roller 1 is in pre-determined positions.

In operation, momentary depression of a turn up button 94 actuates the contactors 82 and 83 which cause the motor 80 to run forwardly rapidly moving the roller 1 from the starting position to position 66. When the roller reaches the position 66, the limit switch 91 is moved to its lower position interrupting the only holding circuit for the contactor 82 and completing circuits for the contactor 84 and the valve winding 81. Operation of the valve 31 admits air to the cylinders 8 and 16 moving the roller from the position 66 through the position 67 to the position 68. Actuation of the contactor 84 reverses the motor 80 which runs with an armature shunt and series resistor connection provided by a resistor 95, moving the roller slowly from the position 68 to the position 69. The limit switch 91 returns to its upper position as soon as disengaged by the reversely driven cam 90, but such action does not affect any control circuits. Opening of the limit switch 89 during this reverse rotation of the motor is of no effect since the switch 89 is by-passed by a now-closed contact of the contactor 83.

When the roller reaches the position 69, the limit switch 92 moves to its lower position deenergizing the contactors 83 and 84 and the valve winding 81. The winding 81 was held energized by a circuit through the upper contact of the limit switch 92 and contactor on the contactors 84 and 83. Air is exhausted from the cylinders 8 and 16 moving the roller from the position 69 through position 70 to the position 71. The contactor 82 is actuated by a circuit through the limit switch 92 in its lower position causing the motor 80 to run forwardly with an armature shunt and series resistor connection provided by a resistor 96 and to move the roller slowly from the position 71 toward the starting position.

When the roller reaches the starting position, the limit switch 89 is opened by the cam 90 deenergizing the contactor 82 which causes the motor 80 to stop by dynamic braking, the closed circuit for which is provided by portions of the resistors 95 and 96.

With the roller in the starting position, momentary depression of the turn down button 98 actuates the contactors 82 and 85 and energizes the valve winding 81. Operation of the valve 31 admits air, moving the roller 1 from the starting position through the position 74 to the position 75. The motor runs at a slow speed due to an armature shunt and series resistor connection provided by the resistor 96 and moves the roller from the position 75 to the position 76.

When the roller reaches the position 76, the limit switch 91 is moved to its lower position by the cam 90 deenergizing the contactor 82 and the valve winding 81. Exhaustion of air moves the roller from the position 76 through the position 77 to the position 78. With the limit switch 91 in its lower position the contactor 84 is actuated to reverse the motor 80 which, because the contactor 85 remains energized, moves the roller rapidly from the position 78 toward the starting position.

Dynamic braking of the motor stops it promptly and accurately in proper positions for starting and reversal. A stop push button 99 may be provided so that the operator can stop the motor at any time during its operation by deenergizing the contactors that are energized at the time.

Having thus described our invention, we claim:

1. A ply turning device comprising a rotatable support, an arm, a ply turning tool carried by the arm and disposed generally transverse to the rotational axis of said support, means connecting the arm to the support for rotation therewith and for universal tilting movement toward and away from the rotational axis of the support about an axis angularly disposed to the rotational axis, means to rotate the support and thus said arm, and means to tilt the arm.

2. A ply turning device comprising a rotatable support, an arm, a ply turning tool carried by the arm and disposed generally transverse to the rotational axis of said support, means connecting the arm to the support for rotation therewith and for universal tilting movement toward and away from the rotational axis of the support about tilting axes both of which are angularly disposed to the rotational axis, means to rotate the support, separate power mechanisms operatively connected to the arm, one of said power mechanisms being operative to tilt the arm about one of said tilting axes and hold it in tilted position and the other mechanism being operative to tilt the arm about the other of said tilting axes to an operative position while it is held in said first tilted position.

3. A ply turning device comprising a rotatable support, an arm, a ply turning tool carried by the arm and disposed generally transverse to the rotational axis of said support, means connecting the arm to the support for rotation therewith and for universal tilting movement toward and away from the rotational axis of the support about tilting axes angularly disposed to the rotational axis, means to rotate the support, separate power mechanisms operatively connected to the arm, one of said power mechanisms being operative to tilt the arm about one axis and hold it in tilted position and the other mechanism being operative to tilt the arm about the other tilting axis to an operative position while it is held in said first tilted position, and means interconnecting the power mechanisms to cause actuation of one of said mechanisms in pre-determined relation to the operation of the other.

4. A ply turning device in accordance with claim 2 characterized further in that one of said mechanisms is operative to hold the arm yieldably in said operative position.

5. A ply turning means for a tire building machine which includes a rotatable drum and comprising ply turning devices adapted to be positioned at the ends of the drums respectively, said devices being rotatable about axes angularly disposed to the drum axis respectively and being manipulatable during their rotation to turn ply on the drum, gear trains respective to the devices for rotating the same, a driving shaft common to and operatively connected to the gear trains, said shaft being composed of a plurality of complementary splined telescopic sections, whereby the devices can be adjusted to different positions lengthwise of the shaft, without disturbing the driving relation, and means to adjust the devices to said positions.

6. A ply turning device comprising a rotatable support, means to rotate the support, an arm, a ply turning tool on the arm and disposed generally transverse to the rotational axis of said support, pivot means securing the arm to the support for rotation therewith and for tilting about one axis which is angularly disposed to the rotational axis of the support, means supporting the pivot means for tilting about an axis which is angularly disposed to said one axis and to the rotational axis of the support, and means to tilt the arm about said tilting axes.

7. A ply turning device comprising a rotatable support, means to rotate the support, an arm, a ply turning tool on the arm and disposed generally transverse to the rotational axis of said support, pivot means securing the arm to the support for rotation therewith and for tilting about one axis which is angularly disposed to the rotational axis of the support, means supporting the pivot means for tilting about an axis angularly disposed to said one axis and to the axis of the support, and power means connected to the arm and to the pivot means and operative to tilt the arm and pivot means about their tilting axes respectively in rotated positions of the support and arm.

8. A ply turning device comprising a support rotatable about an upright axis, a horizontal pivot mounted on the support for tilting about a horizontal axis angularly disposed to the axis of the pivot, an arm non-rotatably carried by the pivot and tiltable about the axis thereof, a ply turning tool carried by the arm and disposed generally transverse to the rotational axis of said support, a positioning piston and cylinder assembly operatively interconnecting the arm and support for tilting the arm, a pressure piston and cylinder assembly operatively interconnecting the pivot and support for tilting the pivot, means for supplying working fluid to the cylinders in pre-determined relation, and means for rotating the support and thus said arm.

9. In a tire building machine comprising a rotatably supported tire building drum, a roller to be moved into engagement and to press overhanging ply material initially in a radial direction against a bead core on the end of the drum and to be continuously tilted about the bead core while maintained in pressing engagement with the ply material so as to fold the ply about the bead core from one side of the periphery to the other, a mounting for the roller comprising a support rotatable about an axis angularly disposed relative to the drum axis, means to rotate the support, an arm mounted on the support for rotation therewith and for universal tilting movement toward and away from the rotational axis from the support, means connecting the roller to the arm for rotation about an axis which extends generally lengthwise of the drum when the roller is positioned in its initial ply folding position by the arm, and means to tilt the arm.

10. In a tire building machine comprising a rotatably supported tire building drum, a roller to be moved into engagement and to press overhanging ply material initially in a radial direction against a bead core on the end of the drum and to be continuously tilted about the bead core while maintained in pressing engagement with the ply material so as to fold the ply about the bead core from one side of the periphery to the other, a mounting for the roller comprising a support rotatable about a fixed axis, power means to rotate the support, a supporting arm supporting the roller, a pivot connecting the arm to the support for rotation therewith and for tilting movement about a pivotal axis angularly disposed to the fixed axis, means supporting the pivot for tilting about another axis angularly disposed to the axis of the pivot and to the fixed axis, means connecting the roller to the arm, and power means carried by the support and operatively connected to the arm and pivot respectively to tilt the arm about the pivotal axis and said other axis respectively.

11. In a tire building machine comprising a rotatably supported tire building drum, a roller to be moved into engagement and to press overhanging ply material initially in a radial direction against a bead core on the end of the drum and to be continuously tilted about the bead core while maintained in pressing engagement with the ply material so as to fold the ply about the bead core from one side of the periphery to the other, a mounting for the roller comprising a support rotatable about a fixed axis, means to rotate the support, a supporting arm supporting the roller, a pivot connecting the arm to the support for rotation therewith and for tilting movement about a pivotal axis angularly disposed to the fixed axis, means supporting the pivot for tilting about another axis angularly disposed to the pivotal axis and to the fixed axis, and means connecting the roller to the arm, a positioning piston and cylinder assembly operable to tilt the arm about one tilting axis to position the roller with its axis generally lengthwise of the drum, a pressure piston and cylinder assembly operable to tilt the arm about the other tilting axis and thereby press the roller against the bead core, and control means to admit and release working fluid from the cylinders in pre-determined relation to each other and to the rotated positions of the support.

FLORIAN J. SHOOK.
JOHN W. WHITE.
EDWIN E. MALLORY.

REFERENCES CITED

The following references are of record in the file of this patent:

UNITED STATES PATENTS

| Number | Name | Date |
|---|---|---|
| Re. 18,394 | Warner | Mar. 22, 1932 |
| 1,723,563 | Lehman | Aug. 6, 1929 |
| 2,228,774 | Miller | Jan. 14, 1941 |
| 2,339,551 | Stevens | Jan. 18, 1944 |
| 2,381,379 | Stevens | Aug. 7, 1945 |
| 2,394,318 | McChesney | Feb. 5, 1946 |